(12) United States Patent
Lee et al.

(10) Patent No.: US 7,792,997 B2
(45) Date of Patent: Sep. 7, 2010

(54) FREIGHT BACKBONE MESSAGING ARCHITECTURE

(75) Inventors: Hojoon Lee, Henderson, NV (US);
Sumit Kumar Agrawal, Bangalore (IN);
Jagdish Krishnan, TamilNadu (IN);
Rajesh Patankar, Bangalore (IN);
Partik Singla, Bangalore (IN)

(73) Assignee: Accenture Global Services GmbH, Schaffhausen (CH)

( * ) Notice: Subject to any disclaimer, the term of this patent is extended or adjusted under 35 U.S.C. 154(b) by 341 days.

(21) Appl. No.: 12/014,674

(22) Filed: Jan. 15, 2008

(65) Prior Publication Data
US 2009/0172099 A1 Jul. 2, 2009

(30) Foreign Application Priority Data
Dec. 31, 2007 (IN) .................. 2608/MUM/2007

(51) Int. Cl.
*G06F 15/16* (2006.01)

(52) U.S. Cl. ....................................... 709/246

(58) Field of Classification Search ................. None
See application file for complete search history.

(56) References Cited

U.S. PATENT DOCUMENTS

| | | | |
|---|---|---|---|
| 7,606,902 B2 * | 10/2009 | Rao et al. ................. 709/225 |
| 2003/0099254 A1 * | 5/2003 | Richter ...................... 370/466 |
| 2004/0015366 A1 | 1/2004 | Wiseman et al. |
| 2006/0222003 A1 * | 10/2006 | Majumdar .................. 370/466 |
| 2009/0080444 A1 * | 3/2009 | Kolakeri et al. ............ 370/401 |

* cited by examiner

*Primary Examiner*—Vivek Srivastava
*Assistant Examiner*—Minh-Chau Nguyen
(74) *Attorney, Agent, or Firm*—Fish & Richardson P.C.

(57) ABSTRACT

A messaging architecture extends the communication capability of complex systems in existing enterprises. The architecture implements sophisticated messaging capability between typically disparate order management and shipping systems. As a result, the messaging architecture greatly streamlines order processing and shipping, increases productivity, increases system uptime and provides a baseline solution for customers that desire integrated order processing and shipping.

19 Claims, 5 Drawing Sheets

FREIGHT BACKBONE MESSAGING ARCHITECTURE

PRIORITY CLAIM

This application claims the benefit of Indian Application No. 2608/MUM/2007, filed Dec. 31, 2007 assigned attorney docket number 10022-1165.

BACKGROUND OF THE INVENTION

1. Technical Field

This disclosure relates to a messaging architecture for communications across an enterprise involving multiple systems and technologies.

2. Related Art

Businesses face ever increasing pressure to not only sell an increasingly diverse array of products, but also transport those products in a timely, cost effective, and efficient manner to customers. However, the information technology architecture traditionally implemented a distinct separation between sales order systems and freight and transport systems. As a result, businesses were limited in their ability to seamlessly coordinate sales and shipping and in their ability to view shipping status information from a central point. At the same time, purchasers were hampered in their ability to obtain status information and receive assurance that their purchases would arrive in a timely manner.

While companies implement new systems and technologies as they become available, the same companies also generally continue to keep their legacy systems intact. Integrating a legacy system with new technologies and systems can be a very expensive, technically challenging, and lengthy process. Furthermore, even once the new technology is implemented, tedious configurations may be necessary every time a minor change is needed in the system. These issues frustrate attempts to improve shipping and freight system architectures.

A need exists for a messaging architecture that addresses the problems noted above and other previously experienced.

SUMMARY

A messaging architecture extends the communication capability of complex systems in existing enterprises. The architecture implements sophisticated messaging capability between typically disparate order management and order shipping systems. The architecture improves centralized access to shipping and purchasing information in a way that also shields the primary order management systems from extended downtime during reconfiguration tasks. As a result, the architecture greatly streamlines order processing and shipping, increases productivity, increases system uptime and provides a widely applicable integration solution.

In one implementation, the architecture includes an outbound channel. The outbound channel establishes an outbound asynchronous transformation process and a synchronous wrapper process around the outbound asynchronous transformation process. The synchronous wrapper process accepts an outbound message, passes the outbound message to the outbound asynchronous transformation process, and waits for an acknowledgment from the outbound asynchronous transformation process of receiving the outbound message.

The outbound asynchronous transformation process accepts the outbound message from the synchronous wrapper process, and sends the acknowledgment for receiving the outbound message to the synchronous wrapper process. The outbound asynchronous transformation process also transforms the outbound message into an outbound transformed message by applying an outbound transformation ruleset to the outbound message. The outbound asynchronous transformation process then asynchronously communicates the outbound transformed message to a recipient.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The architecture may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
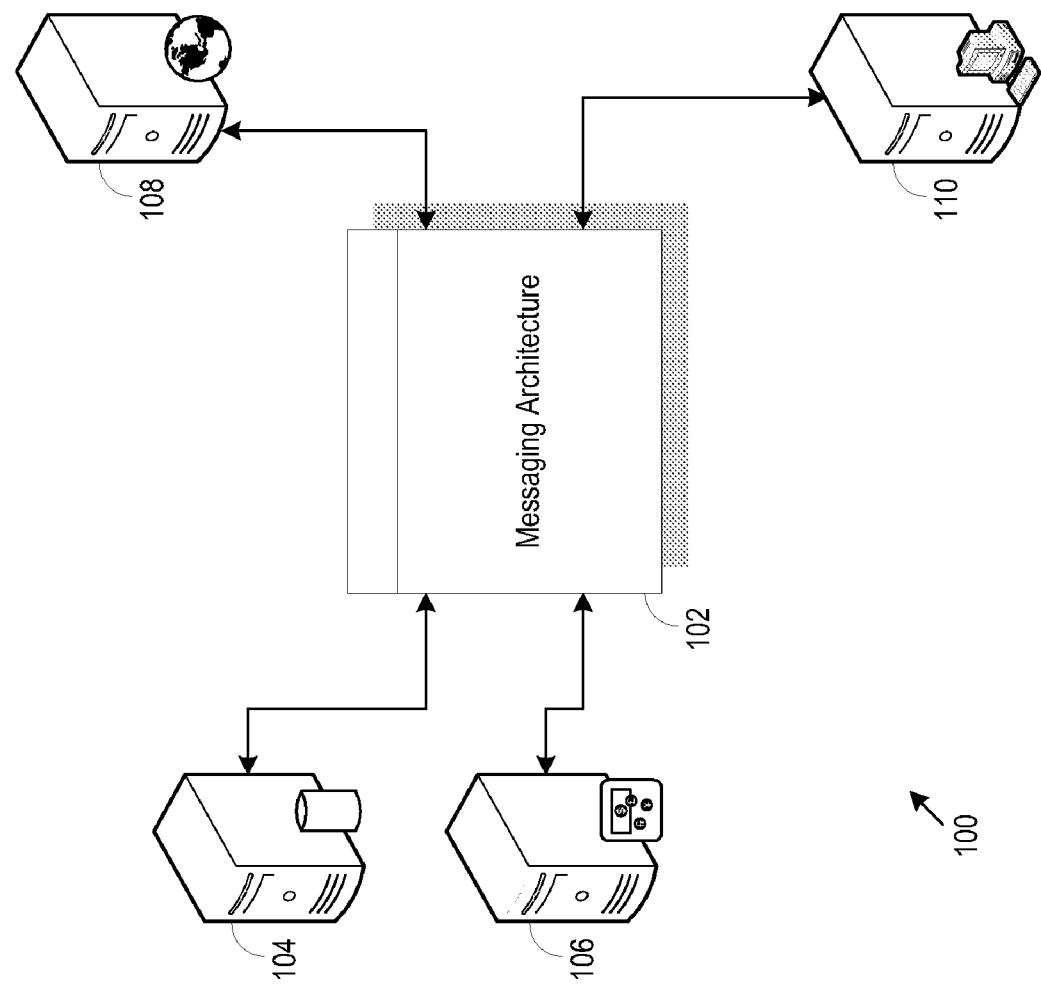
FIG. 1 shows a system implementation in which enterprise systems communicate through a messaging architecture.

FIG. 1 shows a system implementation 100 in which multiple systems communicate through a messaging architecture 102. The system implementation 100 may include any number of systems, each of which may vary widely in implementation and purpose. In the example shown in FIG. 1, an order management system 104 and an e-commerce system 106 communicate through the messaging architecture 102 with a freight system 108 and a customer contact system 110. The messaging architecture 102 facilitates the flow of information between the systems 104-110, as described in more detail below.

The order management system 104 may implement order acceptance, order processing, and/or shipping request functions. As one example, the order management system may be a Siebel™ customer relationship management system. The e-commerce system 106 may implement online (e.g., web-based) purchasing and order fulfillment functions. The freight system 108 may implement freight pricing, routing, scheduling, and other shipping functions. In one implementation, the Oracle™ Transport Manager implements the freight system 108. The customer contact system 110 may implement customer feedback, communication, or other customer contact functions. The logic in the messaging architecture 102 may be designed and implemented in a customized Oracle™ Fusion middleware layer. Many other types of systems may be included in the system implementation and may communicate through the messaging architecture 102. As one example, a customer relationship management (CRM) system may communicate using the architecture 102 in addition to, or in place of the order management system 104.

The messaging architecture 102 may automate several scenarios of quote to cash lifecycles for freight forwarders and asset based shippers for all modes of transportation. For example, in a first scenario, the messaging architecture 102 facilitates a single leg, port-to-port trip, including: order entry through the order management system 104, sending the order to the freight system 108, executing shipment planning in the freight system 108, and executing pricing in the freight system 108, with pricing information sent back from the freight system 108 to the order management system 104. In a second scenario, the messaging architecture 102 facilitates a multi-leg, multi-mode scenario, including: order entry through the order management system 104, sending the order to the freight system 108, executing shipment planning in the freight system 108, executing pricing in the freight system 108, with pricing information sent back from the freight system 108 to the order management system 104, and shipment execution in which shipment activities and status are updated in the freight system 108 and viewing in the order management system 104. A portlet may be implemented to provide data (e.g., shipment planning, shipment execution, or shipment pricing) visibility into the freight system 108 from the order management system 108. In addition, the messaging architecture 102 may facilitate the implementation of other scenarios.

Figure 2:
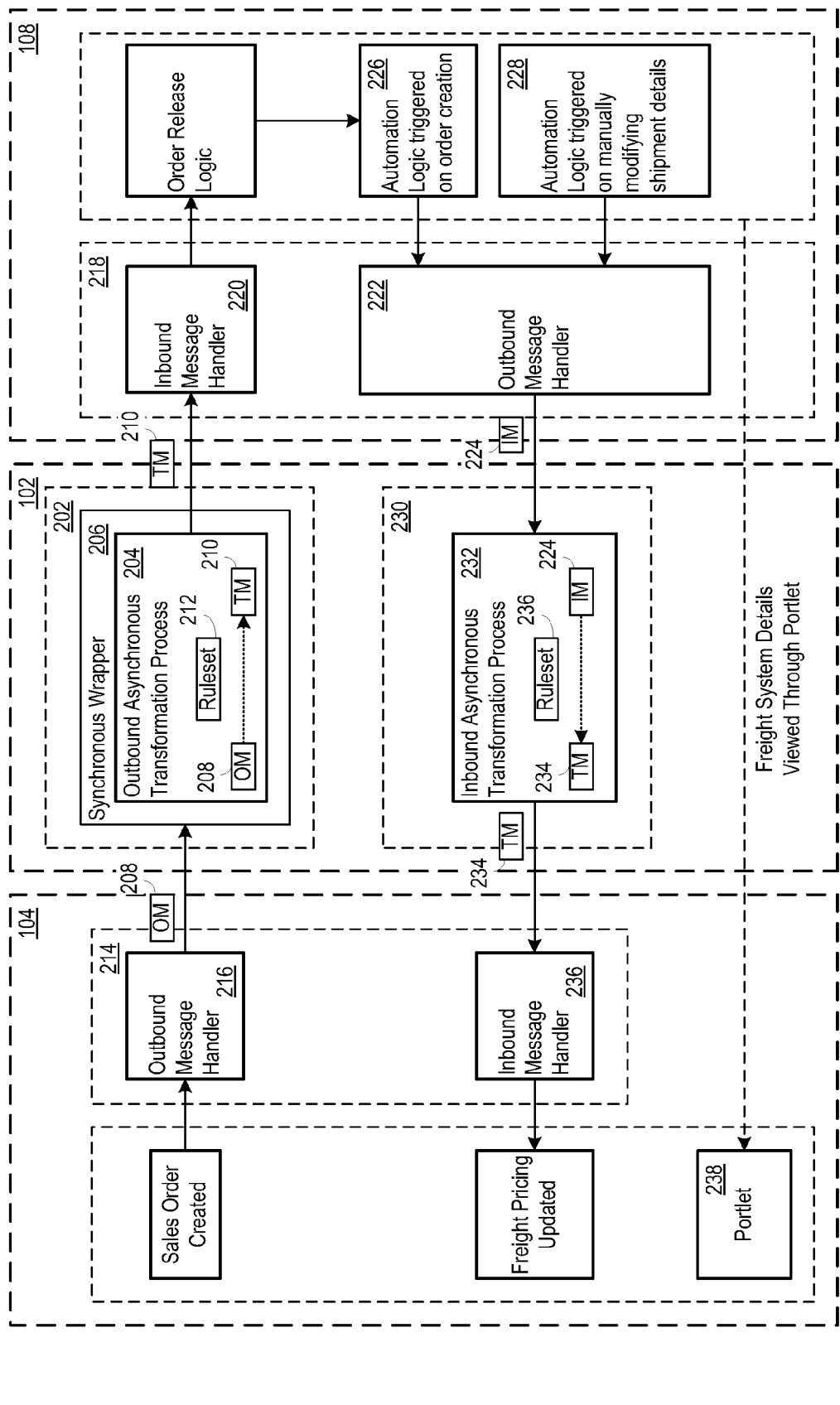
FIG. 2 shows a detailed view of a system implementation including the messaging architecture.

FIG. 2 shows a detailed view of the system implementation 100 focusing on the order management system 104 and the freight system 108. In particular, the order management system 104 communicates through the messaging architecture 102 with the freight system 108.

The messaging architecture 102 establishes an outbound channel 202 including an outbound asynchronous transformation process 204 and a synchronous wrapper process 206 around the outbound asynchronous transformation process 204. The synchronous wrapper process 206 accepts an outbound message 208 and passes the outbound message 208 to the outbound asynchronous transformation process 204. In addition, the synchronous wrapper process 206 waits for an acknowledgment from the outbound asynchronous transformation process 204 of receiving the outbound message 208.

The outbound asynchronous transformation process 204 accepts the outbound message 208 from the synchronous wrapper process 206 and sends the acknowledgment for receiving the outbound message 208 to the synchronous wrapper process 206. The asynchronous transformation process 204 transforms the outbound message 208 into an outbound transformed message 210. In one implementation, the transformation proceeds according to an outbound transformation ruleset 212 that the asynchronous transformation process 204 follows when transforming the outbound message 208. The asynchronous transformation process 204 asynchronously communicates the outbound transformed message 210 to a recipient, in this instance the freight system 108.

The order management system 104 includes a system interface 214. The system interface 214 includes an outbound message handler 216. The outbound message handler 216 sends the outbound message 208 to the synchronous wrapper 206, which is configured to accept the outbound message 208. The outbound message handler 216 may include a web service, an interprocess communication mechanism, or other message passing mechanism.

Similarly, the freight system 108 includes a system interface 218. The system interface 218 includes an inbound message handler 220. The inbound message handler 220 receives the outbound transformed message 210. The inbound message handler 220 may include a web service, an interprocess communication mechanism, or other message passing mechanism.

The freight system 108 also includes an outbound message handler 222 in the system interface 218. The outbound message handler 222 may include a web service, an interprocess communication mechanism, or other message passing mechanism. The freight system 108 processes the information received from the order management system 104 and generates responsive inbound messages (e.g., messages back to the order management system 104). One inbound message is labeled 224 in FIG. 2. Inbound messages may arise from an automated agent 226 or other logic that execute when triggered (e.g., by order creation or shipment finalization), or from an automated agent 228 or other logic that executes when triggered by manual modifications to shipment details within the freight system 108.

The messaging architecture 102 also establishes an inbound channel 230 including an inbound asynchronous transformation process 232. The inbound asynchronous transformation process 232 obtains the inbound message 224 from the outbound message handler 222. The inbound message 224 may arise responsive to the outbound transformed message 210 and the processes that the freight system 108 executes in response to receipt of the outbound transformed message 210. The inbound asynchronous transformation process 232 transforms the inbound message 224 into an inbound transformed message 234 by following an inbound transformation ruleset 236 when transforming the inbound message 224.

The system interface 214 in the order management system 104 also includes an inbound message hander 236. The inbound asynchronous transformation process 232 is configured to communicate the inbound transformed message 234 to the first system inbound message handler 236. The inbound message handler 220 may include a web service, an interprocess communication mechanism, or other message passing mechanism. The inbound message handler 220 may also trigger updates in the order management system 104, such as to update a freight pricing view, update related database records with the information in the inbound transformed message 234, or take other actions.

In addition, the order management system 104 may establish a portlet 238. The portlet may communicate directly with the freight system 108 through a web interface or other communication mechanism. The portlet may also establish a graphical user interface through which an operator views shipping details stored in the freight system.

The transformation processes 204, 232 noted above may be implemented in many different ways. For example, the transformation processes 204, 232 may be implemented with a business process execution language (BPEL). Similarly, the message handlers 216, 220, 222, 236 may be implemented in many different ways, and need not be implemented in the same way in every architecture or implemented in the same way within the same architecture. The rulesets 212 and 236 may define mappings for converting messages between message formats. For example, the rulesets 212 and 236 may establish mappings between a format used by the order management system 104 to a format used by the freight system 108. The rulesets may specify message field addition, deletion, modification or reordering, or data modification, data creation, data derivation, data re-ordering, data format conversion, data field default values, or other data manipulation options that, starting with a source format message, yield a destination format message.

One example of operation includes an operator entering a sales order in the order management system 104. The operator may send the sales order to the freight system 108 via the outbound message 208 using a user interface element, though the order management system 104 may automatically send the sales order as well. The outbound message handler 216 is triggered at this point in time, which in turns invokes the outbound channel 202, including the synchronous wrapper 206 and asynchronous transformation process 204 to transform the order management system data into a format recognized by the freight system 108.

The outbound channel 202, and specifically the asynchronous transformation process 204, invokes the inbound message handler 220, which triggers creation of an order release in the freight system 108. In response, the automation logic 226 is triggered. The automation logic 226 may perform the following operations: create a job report (e.g., in Extensible Markup Language (XML)), build a shipment, apply payment terms, assign the shipment a general ledger code, update order status to reflect billing, send job report to the outbound message handler 222, and send a notification to a consignee informing that job report was sent.

The outbound message handler 222, invokes the inbound channel 230. The asynchronous transformation process 232 transforms pricing details in the job report passed in the inbound message 224 to freight pricing details that the order management system 104 recognizes. The outbound message handler 230 then invokes the inbound message handler 236. As result of this invocation, freight pricing is updated in the order management system 104. As noted above, a portlet 238 is also configured in the order management system 104, which gives access to shipment details from the freight system 108. Manual modifications done to shipment details in the freight system 108 may trigger the automation agent 228 which resends an updated job report through the inbound channel 230 to the order management system 104.

The outbound message handler 216 may be activated by the operator through a button-press activity, such as by clicking on a 'Send to Freight' button in a sales order screen. When the outbound message handler 216 is a web service, it may be created by importing a web services definition language (WSDL) file. The order management system 104 may then create an integration object, a business service, a metadata XML file, and a log file. Compiling the integration object and business service yields an updated repository (SRF) file. Configuring the order management system 104 may include, for a Siebel™ client, navigating to Sitemap→Administration-Web Service→Outbound WS, and importing the metadata XML noted above. Configuring may also include navigating to Sitemap→Administration-Integration→Data Map Editor and mapping the 'Internal Order Interface' to the generated integration object, configuring a workflow for a signal attached to the 'Send to Freight' button and mapping the outbound web service with send to the enterprise application integration node of the workflow.

Figure 3:
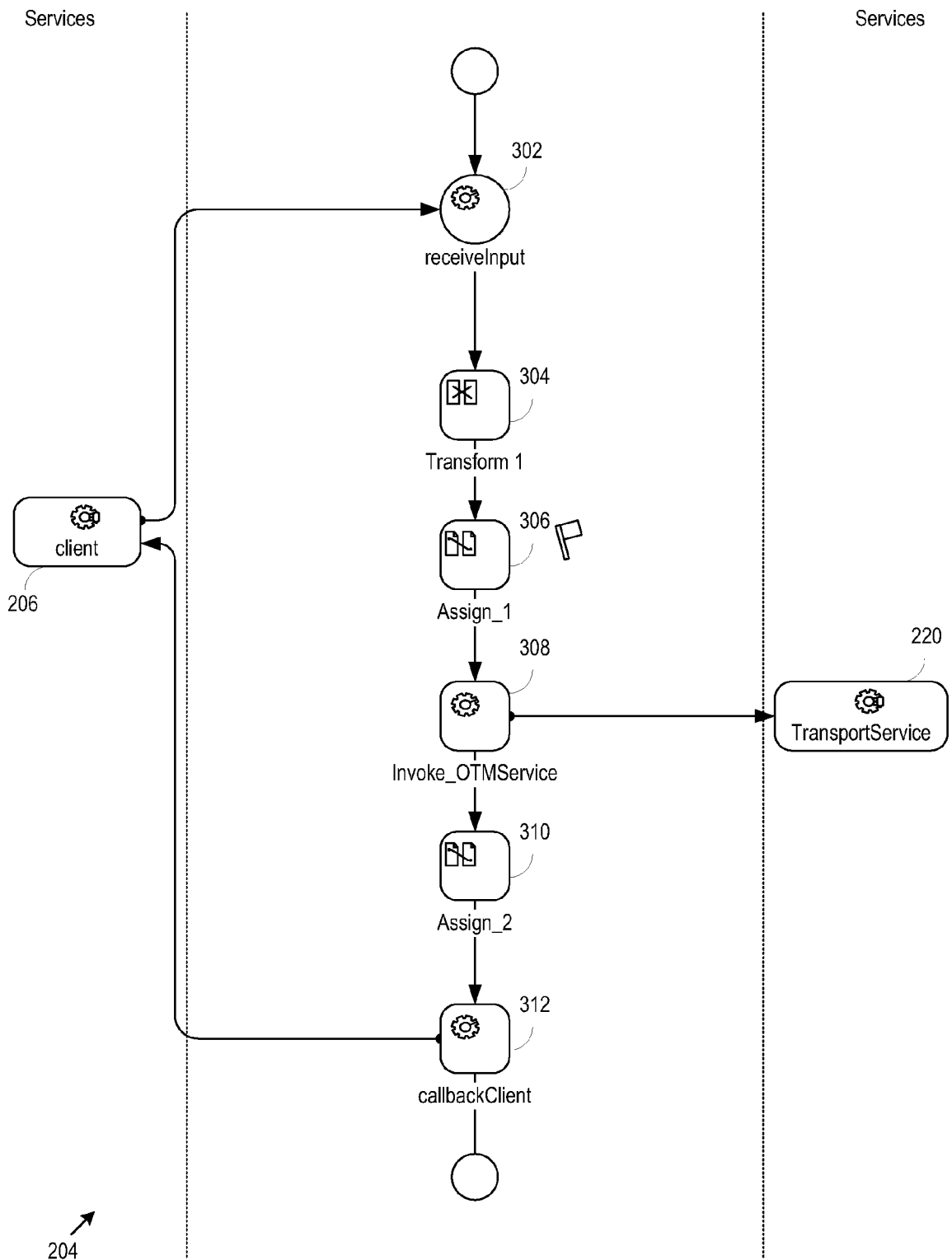
FIG. 3 shows an outbound asynchronous transformation process.

FIG. 3 shows an example implementation of the outbound asynchronous transformation process 204. The outbound asynchronous transformation process 204 receives (302) order details (e.g., in the outbound message 208) from the synchronous wrapper process 206 and transforms (304) order details from the format of the order management system 104 to the format of the freight system 108. For example, the order details from the sales order fields used by the order management system 104 may be mapped to the order release fields used in the freight system 108. Siebel™ Message may be an input schema and Oracle™ Transport Manager Transmission XML may be an output schema.

Prior to sending the transformed message 210 to the freight system 108, the asynchronous transformation process 204 assigns and checks variables used for further processing (306). The outbound asynchronous transformation process 204 may be asynchronous in the sense of the "Send and Forget" messaging paradigm. The outbound asynchronous transformation process 204 invokes the inbound message handler 220 (308) and sends the transformed message 210 to the freight system 108. This process may lead to an order release in the freight system 108. After sending the transformed message 210 to the freight system 108, the asynchronous transformation process 204 assigns and checks variables used for further processing (310).

Because the freight system 108 may take a significant amount of time to obtain shipment details, the outbound asynchronous transformation process 204 does not wait until the freight system 108 returns the shipment information. Instead, the outbound asynchronous transformation process 204 completes, with processing returning to the synchronous wrapper process 206 (312). When the shipment information is available, the freight system 108 sends the shipment information back to the order management system 104 through the outbound message handler 222. A work flow in the freight system 108 may trigger the message handler 222.

The inbound message handler 220 may be a web service responsive to, for example, Simple Object Access Protocol (SOAP) over the Hypertext Transfer Protocol (HTTP). The inbound message handler 220 may be invoked using the business process execution language 'Invoke Activity' feature, with a partner link referring to the web service implementing the inbound message handler 220. The freight system 108 may also send back a transmission identifier as an acknowledgement. The transmission identifier may serve as a check on the status of the transmission to the freight system 108.

Figure 4:
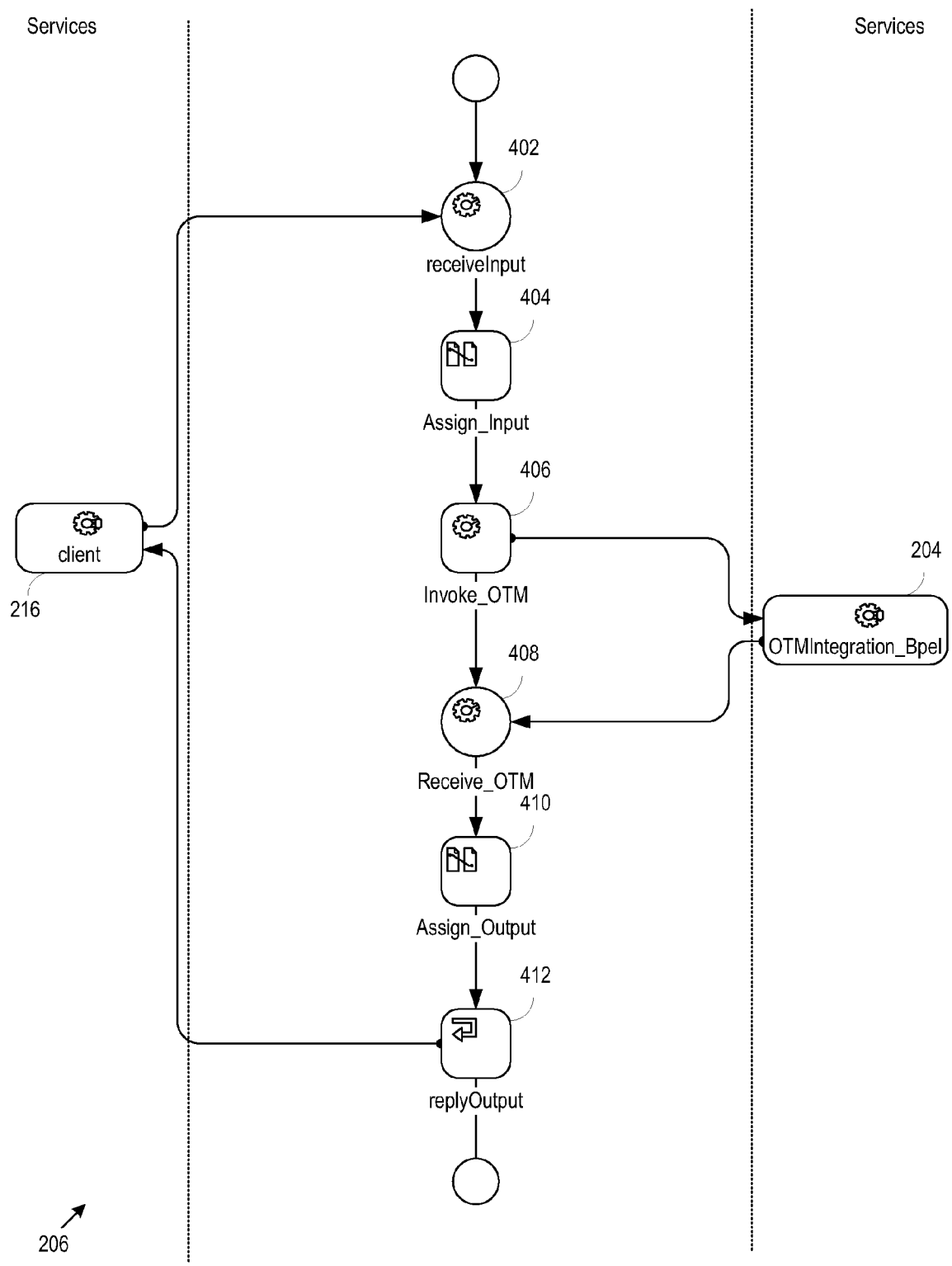
FIG. 4 shows a synchronous wrapper process.

FIG. 4 shows an example implementation of the synchronous wrapper process 206. The synchronous wrapper process 206 around the asynchronous transformation process 204 provides the messaging architecture 102 with a technical advantage. In particular, the synchronous wrapper process 206 insulates the messaging architecture 102 against changes that affect message flow to the freight system 108. Such changes include, for example, a change to the endpoint Uniform Resource Locator (URL) in the WSDL file that locates the inbound message handler 220.

Without the synchronous wrapper process 206, a change in the endpoint URL would require a reconfiguration in the order management system 104. Stopping and reconfiguring the order management system 104 is a time consuming, expensive, and inefficient operation. The synchronous wrapper process 206 provides an intermediate architectural construct in which changes (e.g., to the endpoint URL) may be made at the wrapper process level instead of at the order management system 104. For example, the synchronous wrapper process 206 may be updated to reflect any change to the target service, such as the change to the endpoint URL specifying the inbound message handler 220. Thus, the synchronous wrapper process 206 allows the messaging architecture 102 to avoid undesirable reconfiguration at the order management system 104.

The synchronous wrapper process 206 receives the outbound message 208 (402). After receiving the outbound message 208, the synchronous wrapper process 204 assigns and checks variables used for further processing (404). The synchronous wrapper process 206 invokes the outbound asynchronous transformation process 204, passing the outbound message 206 (406).

The synchronous wrapper process 206 receives an acknowledgment from the outbound asynchronous transformation process of receiving the outbound message 206 (408). After receiving the acknowledgement, the synchronous wrapper process 206 assigns and checks variables used for further processing (410). The synchronous wrapper process 206 also returns a status reply to the outbound message handler 216 (412).

Thus, the synchronous wrapper process 206 is invoked by the order management system 104 and in turn invokes the outbound asynchronous transformation process 204. This indirection makes the order management system 104 and outbound message handler 216 transparent to any changes to the outbound channel 202, while maintaining a synchronous interface for the order management system 104.

The synchronous wrapper process 206 provides service abstraction for the order management system 104. The invocation of web services from the order management system 104 involves complex configurations. Any changes in the invoked web service (for example, a change to the endpoint URL) ordinarily require re-configuration on the order management system 104 side. The synchronous wrapper process 206 provides a fixed wrapper web service for the order management system 104 to invoke. Any changes at the freight system 108 side may be incorporated in the synchronous wrapper process 206 rather than changing the order management system 104.

Figure 5:
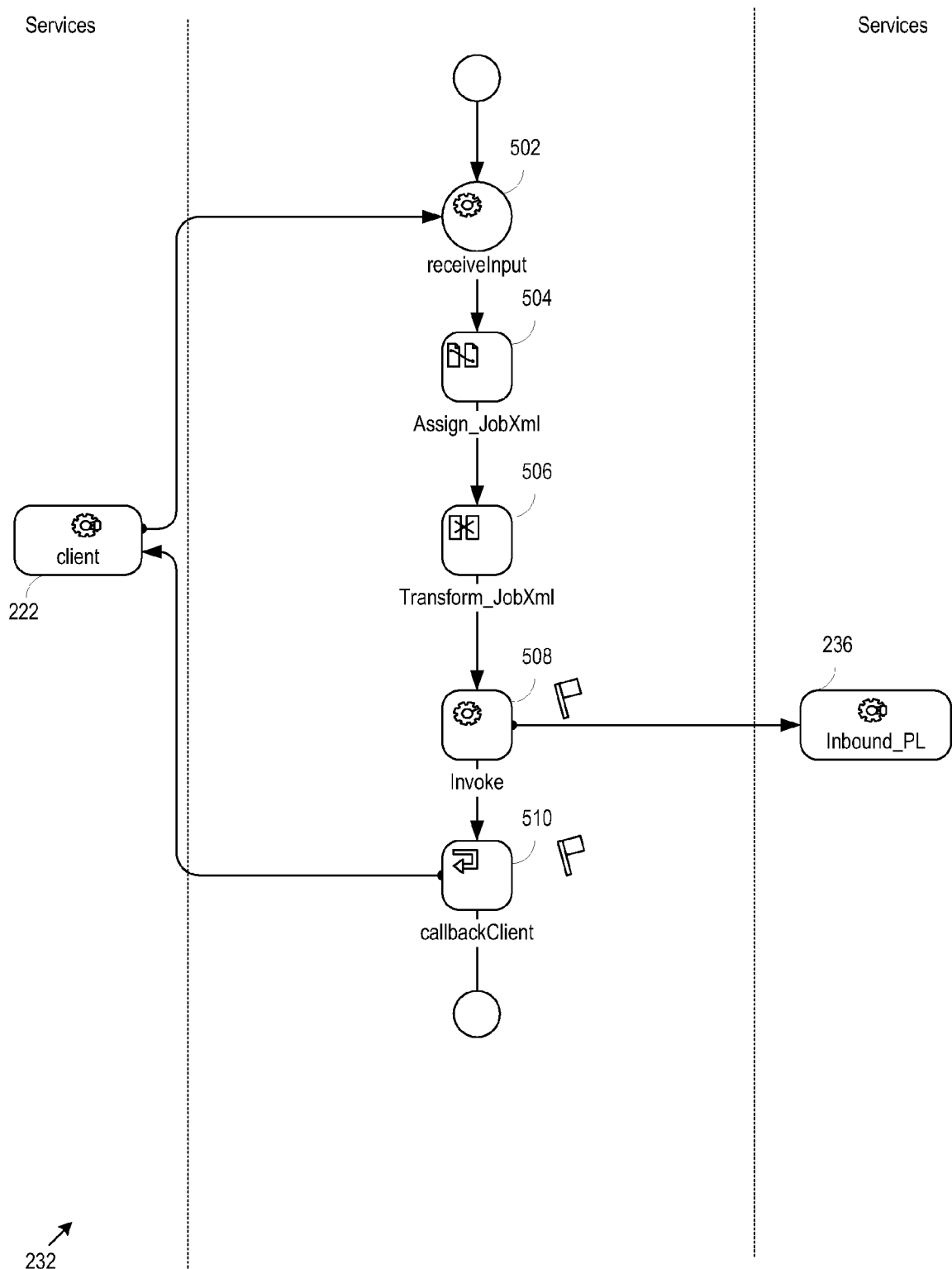
FIG. 5 shows an inbound message process.

FIG. 5 shows the inbound asynchronous transformation process 232. The inbound asynchronous transformation process 232 passes freight pricing details to the order management system 104 (e.g., in the transformed message 234). The inbound asynchronous transformation process 232 receives the inbound message 224 (502). After receiving the inbound message 224, the inbound asynchronous transformation process 232 assigns and checks variables used for further processing (504).

The inbound asynchronous transformation process 232 then transforms (506) the inbound message 224 into the outbound message 234. As a result, the pricing details in the freight system 108 are converted to information compatible with the order management system 104. The inbound asynchronous transformation process 232 then sends the outbound message 234 to the order management system 104 (e.g., by invoking the inbound message handler 236) (508). Processing then continues at the outbound message handler 222 (510).

The automation logic 226, 228 may invoke the inbound asynchronous transformation process 232. The inbound asynchronous transformation process 232 maps pricing details from the freight system 108 job report (e.g., in XML form) to the freight pricing view fields in the order management system 104. To that end, the inbound asynchronous transformation process 232 may take a transmission XML defined for the outbound message handler 222 as an input schema and a schema embedded in the inbound message handler 236 WSDL file as output schema. After mapping the transmission XML relevant fields to the order management system 104 fields, the inbound asynchronous transformation process 232 invokes the inbound message handler 236 and the order management system 104 responsively updates pricing details.

The inbound message handler 236 may be a web service. Creating the web service may entail creating an IO in the order management system 104. The IO may include the relevant fields of for a freight pricing view defined in the order management system 104. Creating the web service may also include updating an Application Services Interface (ASI) in the order management system 104 with this new IO and responsively generating a WSDL file. The WSDL file is used by the inbound asynchronous transformation process 232 to invoke the web service. The web service may insert or update pricing details into a 'Freight Pricing' view or other interface or database supporting the order management system 104. In addition, the web service may insert a job identifier communicated from the freight system 108 as an Integration Identifier in the order management system 104. The portlet 238 may employ the Integration Identifier to identifier, retrieve, and view associated freight details on the freight system 108.

An example of a message schema for communication between a source (e.g., the order management system 104) and a target (e.g., the freight system 108) follows. The transformation of the source system message to the target system message format may be accomplished using an XML Stylesheet (XLST) or other transformation language. Two message flow directions include the forward message flow from the order management system 104 to the freight system 108 for order creation at the freight system 108, and the reverse flow from the freight system 108 to the order management system 104 to provide the price and other details.

Table 1 shows example order management system 104 elements used in the forward flow to the freight system 108.

TABLE 1

| Slno | Elements | Description |
|---|---|---|
| 1 | ListOfOrderInterface | The Parent tag that holds orders |
| 2 | Orders | |
| 3 | BillToAccount | |
| 4 | Description | |
| 5 | ShippingTerms | |
| 6 | FreightTermsInfo | |
| 7 | OrderDate | |
| 8 | OrderNumber | |
| 9 | PayToAccount | |
| 10 | ShipToAccount | |
| 11 | BuyerNotes | |
| 12 | PortOfDischarge | |
| 13 | PortOfLoad | |
| 14 | AccountOrderNumber | |
| 15 | ListOfLineItems | This Tag is the child tag of Order tag that contains line item details |
| 16 | LineNumber | |
| 17 | ProductName | |
| 18 | Seal2 | |
| 19 | Seal1 | |
| 20 | PackageType | |
| 21 | ContainerNumber | |
| 22 | ShipUnitCount | |
| 23 | ListOfAttributes | This tag is the parent tag that holds the attributes |
| 24 | Attributes | |

Table 2 shows example freight system 108 elements used in the forward flow to the freight system 108.

TABLE 2

| Slno | Element | Description |
|---|---|---|
| 1 | TransportXMLElement | Top Most Parent Tag that houses the underlying elements |
| 2 | ReleaseGid | |
| 3 | TransactionCode | |
| 4 | ShipFromLocationRef | |
| 5 | ShipToLocationRef | |
| 6 | ReleaseLine | Parent Tag that houses PackagedItemRef, ItemQuantity, WeightVolume, PackagedItemCount, TransportHandlingUnitRef |
| 7 | PackagedItemRef | |
| 8 | ItemQuantity | |
| 9 | WeightVolume | |
| 10 | PackagedItemCount | |
| 11 | TransportHandlingUnitRef | |

TABLE 2-continued

| Slno | Element | Description |
|---|---|---|
| 12 | ShipUnit | Parent Tag that houses WeightVolume, ShipUnitContent |
| 13 | WeightVolume | |
| 14 | ShipUnitContent | This is the child tag of ship unit and the Parent Tag PackagedItemRef, ItemQuantity, ReleaseGid |
| 15 | PackagedItemRef | |
| 16 | ItemQuantity | |
| 17 | ReleaseGid | |
| 18 | PlanFromLocationGid | |
| 19 | PlanToLocationGid | |
| 20 | PortOfDisLocationRef | |
| 21 | ReleaseRefnum | |
| 22 | Remark | |
| 23 | REquipment | Parent Tag of REquipmentSequence, EquipmentNumber, EquipmentSeal |
| 24 | REquipmentSequence | |
| 25 | EquipmentNumber | |
| 26 | EquipmentSeal | |
| 27 | InvolvedParty | Parent Tag of InvolvedPartyLocationRef, ContactRef |
| 28 | InvolvedPartyLocationRef | |
| 29 | ContactRef | |

Tables 1 and 2 set forth elements of the order management system 104 and freight system 108 schemas, respectively. These elements are involved in moving the messages used for the forward flow from the order management system 104 to the freight system 108 to create the order in the freight system 108. The ruleset 212 may encode transformations from the source schema to the target schema consistent with the elements shown in Tables 1 and 2. The "Release" (ReleaseId) of the Transport element is used for releasing the order details in the freight system 108, sometimes referred to as the Release Interface.

Table 3 shows freight system 108 schema elements used in the reverse flow from the freight system 108 to the order management system 104.

TABLE 3

| Slno | Element | Description |
|---|---|---|
| 1 | Job | ParentTag |
| 2 | JobGid | |
| 3 | ReleaseGid | |
| 4 | SellSide | ParentTag houses ShipmentCost |
| 5 | ShipmentCost | |
| 6 | ShipmentCostSeqno | |
| 7 | Cost | Parent Tag houses RateToBase, MonetaryAmount |

TABLE 3-continued

| Slno | Element | Description |
|---|---|---|
| 8 | MonetaryAmount | |
| 9 | RateToBase | |
| 10 | AccessorialCodeGid | |
| 11 | GeneralLedgerGid | |
| 12 | PaymentMethodCodeGid | |
| 13 | ShipmentCostDetail | Parent tag that houses Detail |
| 14 | Detail | |
| 15 | TransportModeGid | |

Table 4 shows order management system 104 schema elements used in the reverse flow from the freight system 108 to the order management system 104.

TABLE 4

| Slno | Element | Description |
|---|---|---|
| 1 | OrderEntry-Orders | Parent Tag that houses all the other elements |
| 2 | IntegrationId | |
| 3 | OrderNumber | |
| 4 | FbOrderEntry-FreightPricing | Parent Tag that houses ChargeAmount, ChargeCode, Description2, LineNumber, PrepaidCollect |
| 5 | ChargeAmount | |
| 6 | ChargeCode | |
| 7 | Description2 | |
| 8 | LineNumber | |
| 9 | PrepaidCollect | |

Tables 3 and 4 show the schema elements that the ruleset 236 handles in the inbound asynchronous transformation process 232 to perform data transformation between the freight system 108 and the order management system 104 during the reverse flow for the freight details. For example, each shipment cost from the freight system side is mapped to the FbOrderEntry-FreightPricing parent element, with child elements mapped according the functionality of the elements.

Tables 5-a-5-b show a data mapping that the ruleset 212 may implement between order management system fields and the freight system fields for message flow to the freight system 108. Tables 5-a and 5-b are read left to right to show the freight system XML (sent to the freight system), the corresponding order management system XML (sent to the outbound asynchronous transformation process 204), caption (the order management system front end field), backend field (database table columns in the order management system) and comments. For example, the "ReleaseGid/Gid/DomainName" may be hard coded to "FWD" with no corresponding Caption.

TABLE 5-a

OTM XML

ReleaseGid/Gid/DomainName
ReleaseGid/Gid/Xid
TransactionCode
ReleaseHeader/CommercialTerms/IncoTermGid/Gid/Xid
ReleaseHeader/CommercialTerms/TermLocationText
ShipFromLocationRef/LocationRef/LocationGid/Gid/DomainName
ShipFromLocationRef/LocationRef/LocationGid/Gid/Xid
ShipToLocationRef/LocationRef/LocationGid/Gid/DomainName
ShipToLocationRef/LocationRef/LocationGid/Gid/Xid
TimeWindow/EarlyPickupDate
TimeWindow/LateDeliveryDate TABLE 5-a-continued

| OTM XML |
|---|
| ReleaseLine/ReleaseLineGid/Gid/DomainName |
| ReleaseLine/ReleaseLineGid/Gid/Xid |
| ReleaseLine/PackagedItemRef/PackagedItemGid/Gid/DomainName |
| ReleaseLine/PackagedItemRef/PackagedItemGid/Gid/Xid |
| ReleaseLine/ItemQuantity/WeightVolume/Weight/WeightValue |
| ReleaseLine/ItemQuantity/WeightVolume/Weight/WeightUOMGid/Gid/Xid |
| ReleaseLine/ItemQuantity/WeightVolume/Weight/Volume |
| ReleaseLine/ItemQuantity/WeightVolume/Weight/VolumeUOMGid/Gid/Xid |
| ReleaseLine/ItemQuantity/PackagedItemCount |
| ReleaseLine/ReleaseLineHazmatInfo/IsHazardous |
| ReleaseLine/TransportHandlingUnitRef/ShipUnitSpecRef/ShipUnitSpecGid/Gid/Xid |
| PlanFromLocationGid/LocationGid/Gid/Xid |
| PlanToLocationGid/LocationGid/Gid/Xid |
| PortOfLoadLocationRef/LocationRef/LocationGid/Gid/Xid |
| PortOfDisLocationRef/LocationRef/LocationGid/Gid/Xid |
| ReleaseRefnum/ReleaseRefnumQualifierGid/Gid/Xid |
| ReleaseRefnum/ReleaseRefnumValue |
| Remark/RemarkSequence |
| Remark/RemarkQualifierGid/Gid/Xid |
| Remark/RemarkText |
| Requipment/REquipmentSequence |
| Requipment/EquipmentGroupGid/Gid/Xid |
| Requipment/EquipmentNumber |
| Requipment/EquipmentSeal/SequenceNumber |
| Requipment/EquipmentSeal/SealNumber |
| InvolvedParty/InvolvedPartyQualifierGid/Gid/Xid |
| InvolvedParty/InvolvedPartyLocationRef/LocationRef/LocationGid/Gid/DomainName |
| InvolvedParty/InvolvedPartyLocationRef/LocationRef/LocationGid/Gid/Xid |
| InvolvedParty/ContactRef/Contact/ContactGid/Gid/DomainName |
| InvolvedParty/ContactRef/Contact/ContactGid/Gid/Xid |
| InvolvedParty/ComMethodGid/Gid/Xid |
| ShipUnit/ShipUnitGid/Gid/DomainName |
| ShipUnit/ShipUnitGid/Gid/Xid |
| ShipUnit/TransportHandlingUnitRef/ShipUnitSpecRef/ShipUnitSpecGid/Gid/Xid |
| ShipUnit/WeightVolume/Weight/WeightValue |
| ShipUnit/WeightVolume/Weight/WeightUOMGid/Gid/Xid |
| ShipUnit/Volume/VolumeValue/VolumeValue |
| ShipUnit/Volume/VolumeValue/VolumeUOMGid/Gid/Xid |
| ShipUnit/LengthWidthHeight/Length/LengthValue/LengthUOMGid/Gid/Xid |
| ShipUnit/LengthWidthHeight/Width/WidthValue/WidthUOMGid/Gid/Xid |
| ShipUnit/LengthWidthHeight/Height/HeightValue/HeightUOMGid/Gid/Xid |
| ShipUnit/ShipUnitContent/PackagedItemRef/PackagedItemGid/Gid/Domain |
| ShipUnit/ShipUnitContent/PackagedItemRef/PackagedItemGid/Gid/Xid |
| ShipUnit/ShipUnitContent/LineNumber |
| ShipUnit/ShipUnitContent/ItemQuantity/WeightVolume/Weight/WeightValue |
| ShipUnit/ShipUnitContent/ItemQuantity/WeightVolume/Weight/WeightUOMGid/Gid/Xid |
| ShipUnit/ShipUnitContent/ItemQuantity/WeightVolume/Weight/Volume |
| ShipUnit/ShipUnitContent/ItemQuantity/WeightVolume/Weight/VolumeUOMGid/Gid/Xid |
| ShipUnit/ShipUnitContent/ItemQuantity/PackagedItemCount |
| ShipUnit/ShipUnitContent/ReleaseGid/Gid/DomainName |
| ShipUnit/ShipUnitContent/ReleaseGid/Gid/Xid |
| ShipUnit/ShipUnitContent/ReleaseLineGid/Gid/DomainName |
| ShipUnit/ShipUnitContent/ReleaseLineGid/Gid/Xid |
| ShipUnit/ShipUnitCount |

TABLE 5-b

| OMS 104 XML | OMS 104 Caption | Comments | OMS 104 Back End Field |
|---|---|---|---|
| HARD CODED TO 'FWD' | N/A | | Hard Coded |
| OrderNumber | Booking No | | Order Number |
| HARD CODED TO 'IU' | N/A | | Hard Coded |
| ShippingTerms | Freight Terms | | Freight Terms |
| FreightTermsInfo | Freight Terms Info | | Freight Terms Info |
| HARD CODED TO 'FWD' | N/A | | Hard Coded |
| PayToAccount | Origin Account | | Pay To Account |
| HARD CODED TO 'FWD' | N/A | | Hard Coded |
| ShipToAccount | Delivery Account | | Ship To Account |
| RequestedDate | Requested Available Date | | Requested Ship Date |
| RequestedDeliveryDate | Requested Delivery Date | | Requested Delivery Date |

TABLE 5-b-continued

| OMS 104 XML | OMS 104 Caption | Comments | OMS 104 Back End Field |
|---|---|---|---|
| HARD CODED TO 'FWD' | N/A | | |
| OrderNumber-LineNumber | N/A | may be equal to the ReleaseXid plus a 3 digit sequence. I.E. "TESTORDER-001" Search spec from products: [Part Number] LIKE "FB-P*" | |
| HARD CODED TO 'FWD' | N/A | Search spec from products: [Part Number] LIKE "FB-P*" | |
| ProductName | Commodity | Search spec from products: [Part Number] LIKE "FB-P*" | Product |
| Attribute Name: Gross Weight | Attribute: Gross Weight | total weight of product line item Search spec from products: [Part Number] LIKE "FB-P*" | Display Name(Caption: Name)& Value(Caption: Value) |
| Attribute Name: WeightUnitofMeasure | UoM | Search spec from products: [Part Number] LIKE "FB-P*" | |
| Attribute Name: Total Volume | Attribute: Total Volume | total volume of product line Search spec from products: [Part Number] LIKE "FB-P*" | Display Name(Name)& Value(Value) |
| Attribute record: VolumeUnitOfMeasure | UoM | Search spec from products: [Part Number] LIKE "FB-P*" | |
| ShipUnitCount | Item Count | Search spec from products: [Part Number] LIKE "FB-P*" | Ship Unit Count |
| Attribute: Is Hazardous | Attribute: Is Hazardous | Search spec from products: [Part Number] LIKE "FB-P*" | Display Name(Name)& Value(Value) |
| PackageType | Package Type | Search spec from products: [Part Number] LIKE "FB-P*" | Package Type |
| PayToAccount | Place of Origin | | Pay To Account |
| ShipToAccount | Place of Delivery | | Ship To—Address |
| PortOfLoad | Port of Load | | |
| PortOfDischarge | Port of Discharge | | |
| If Account Order Number is not null, Hard Code to 'PO'. If Order Date is not null, Hard code to BD | Purchase Order Number and Booking Date | For Purchase Order Number, Xid = 'PO', For Booking Date, Xid = 'BD' | |
| For PO = Account Order Number, For BD = Order Date | Purchasae Order and Booking Date | For PO Value = Siebel Field | |
| Freight System will populate. | | | |
| Freight System will populate. | | | Hard Coded |
| BuyerNotes or Description | Buyer Notes/Special Instr. OR Shipper Notes/Special Instr. | | Description |
| LineNumber | | Search spec from products: [Part Number] LIKE "FB-E*" may be 1, 2, 3...or may reuse OMS number coming over. | Line Number |

TABLE 5-b-continued

| OMS 104 XML | OMS 104 Caption | Comments | OMS 104 Back End Field |
|---|---|---|---|
| Product Name | Equipment Type | Search spec from products: [Part Number] LIKE "FB-E*" | ProductName |
| Container Number | Container Number | Search spec from products: [Part Number] LIKE "FB-E*" | Container Number |
| Seal 1 | Seal 1 | serial number assigned for each of the 2 fields Search spec from products: [Part Number] LIKE "FB-E*" | Seal 1 |
| Seal 2 | Seal 2 | In OMS 2 fields may be created to captures seal #s per line item may be a grid, one record for Seal 1, and one for Seal 2. Search spec from products: [Part Number] LIKE "FB-E*" | Seal 2 |
| See Caption Notes—SHIPPER/CONSIGNEE | | Caption Updated | |
| HARD CODED TO 'FWD' Account/BillToAccount | | | |
| HARD CODED TO 'FWD' Account/BillToAccount "EMAIL" | | | |
| HARD CODED to 'FWD' | | | Hard Coded |
| may be equal to the ReleaseXid plus a 3 digit sequence. I.E. "TESTORDER-001" | | | |
| PackageType | Package Type | | Package Type |
| Attribute: Gross Weight (lb) | Attribute: Gross Weight (lb) | | Can be Mapped to the Line Items Attributes Field |
| Attribute record: UnitofMeasure field | | not currently exposed | |
| Attribute: Volume | Attribute: Volume | | |
| Attribute record: UnitofMeasure field | | not currently exposed | |
| LineItems/ListOfAttributes/Attribute: Length | Attribute: Length | | |
| LineItems/ListOfAttributes/Attribute: Width | Attribute: Width | | |
| LineItems/ListOfAttributes/Attribute: Height | Attribute: Height | | |
| HARD CODED to 'FWD' | | | Hard Coded |
| ProductName | Commodity | | Product |
| LineNumber—Sequence from OMS—at the ship unit level: may be the ShipUnitXid plus a 3 digit sequence. I.E. "TESTORDER-001-001 The 3 digit sequence may be the field: LineNumber | Line Number | | Line Number |
| Attribute: Gross Weight (lb)/ShipUnitCount | | not exposed in app | |
| Attribute record: UnitofMeasure field | | not currently exposed | |
| Attribute: Volume/ShipUnitCount | | not exposed in app | |
| Attribute record: UnitofMeasure field | | not currently exposed | |
| OMS unique actual order id | | | Id |
| HARD CODED to 'FWD' | | | |
| Refer Line 15 | To be Done on OTM side | | |
| ShipUnitCount | Ship Unit Count | | Quantity Requested |

Tables 5-a and 5-b and 6 establish the rulesets for transforming messages. As one example, the 'Xid' sent to the freight system 108 should be mapped to 'OrderNumber' coming from the order management system 104. The order management system 104 front end name is 'Booking No' and the matching database table column is 'Order Number'.

Table 6 shows a data mapping that the ruleset 236 may implement between order management system fields and the freight system fields for message flow back to the order management system 104.

TABLE 6

| Order Management System XML | Order Management System Field | Freight System XML (job report) |
|---|---|---|
| Sent to the OMS 104. | Front end field in the OMS 104. | Sent from the freight system 108 to the inbound asynchronous transformation process 232. |
| IntegrationID | Integration ID | Job/JobGid/Gid/Xid |
| OrderNumber | Booking No | Job/Release/ReleaseGid/Gid/Xid |
| ChargeAmount | Charge Amount | "Job/SellSide/Shipment/ShipmentHeader/Shipment Cost/Cost/FinancialAmount/Monetary Amount Div Job/SellSide/Shipment/ShipmentHeader/Shipment Cost/Cost/FinancialAmount/RateToBase" |
| ChargeCode | Charge Code | Job/SellSide/Shipment/ShipmentHeader/Shipment Cost/GeneralLedgerGid/Gid/Xid |
| Description2 | Description | "Job/SellSide/Shipment/ShipmentHeader/Transport ModeGid/Gid/Xid + "":"" + Job/SellSide/Shipment/ShipmentHeader/Shipment Cost/AccessorialCodeGid/Gid/Xid + "":"" + Job/SellSide/Shipment/ShipmentHeader/Shipment Cost/ShipmentCostDetail/Detail" |
| LineNumber | | Job/SellSide/Shipment/ShipmentHeader/Shipment Cost/ShipmentCostSeqno |
| PrepaidCollect | Prepaid Collect | Job/SellSide/Shipment/ShipmentHeader/Shipment Cost/PaymentMethodCodeGid/Gid/Xid |
| Type | Type | "Type" |

The freight backbone technology is grounded in Accenture's experience in providing exceptional solutions for high performance business. Among the thought leaders in this area are Jason Ringgenberg, Sergio Nogueira, and Chuan Neo Chong.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system, comprising:
one or more computers configured to perform operations comprising:
executing an outbound asynchronous transformation process and a synchronous wrapper process around the outbound asynchronous transformation process;
the synchronous wrapper process configured to:
maintain configuration information specifying one or more message flow details for a recipient;
receive a notification that a first message flow detail has been changed, and update the configuration information in response to the notification;
receive an outbound message from a sender;
pass the outbound message to the outbound asynchronous transformation process; and
wait for an acknowledgment from the outbound asynchronous transformation process, the acknowledgement indicating that the outbound message was received by the outbound asynchronous process; and
the outbound asynchronous transformation process configured to:
receive the outbound message from the synchronous wrapper process;
send the acknowledgment to the synchronous wrapper process;
apply an outbound transformation ruleset to transform the outbound message into an outbound transformed message; and
asynchronously communicate the outbound transformed message to the recipient according to the message flow details in the updated configuration information.

2. The system of claim 1, where the recipient includes a recipient inbound message handler and a recipient outbound message handler.

3. The system of claim 2, where the operations further comprise:
executing a sender inbound message handler, and
executing an inbound asynchronous transformation process configured to:
obtain an inbound message from the recipient outbound message handler responsive to the outbound transformed message;
transform the inbound message into an inbound transformed message by applying an inbound transformation ruleset to the inbound message; and
communicate the inbound transformed message to the sender inbound message handler.

4. The system of claim 3, where:
the outbound transformation ruleset comprises
an order management system to transport management system message transformation ruleset; and the inbound transformation ruleset comprises a transport management system to order management system message transformation ruleset.

5. The system of claim 2, where:

one or more of the outbound asynchronous transformation process and a synchronous wrapper process and the recipient inbound message handler comprise a web service.

6. The system of claim 1, where the wrapper process receives the outbound message from an order management system, the recipient is a freight system, and the outbound message includes order information.

7. The system of claim 1, where the asynchronous transformation process further causes automated logic in the recipient to be executed.

8. A method comprising:

executing an outbound asynchronous transformation process and executing a distinct synchronous wrapper process for the outbound asynchronous transformation process;

where executing the synchronous wrapper process comprises:

maintaining configuration information specifying one or more message flow details for a recipient;

receiving a notification that a first message flow detail has been changed, and updating the configuration information in response to the notification;

receiving an outbound message from a sender;

passing the outbound message to the outbound asynchronous transformation process;

waiting for an acknowledgement from the outbound asynchronous transformation process, the acknowledgment indicating that the outbound message was received by the outbound asynchronous transformation process; and where executing the outbound asynchronous transformation process comprises:

receiving the outbound message from the synchronous wrapper process;

sending the acknowledgment to the synchronous wrapper process;

applying an outbound transformation ruleset to transform the outbound message into an outbound transformed message; and asynchronously communicating the outbound transformed message to the recipient according to the message flow details in the updated configuration information.

9. The method of claim 8, further comprising:

executing an inbound asynchronous transformation process;

obtaining an inbound message from a second system outbound message handler responsive to the outbound transformed message;

transforming the inbound message into an inbound transformed message by applying an inbound transformation ruleset to the inbound message; and communicating the inbound transformed message to a sender inbound message handler.

10. The method of claim 8, where the wrapper process receives the outbound message from an order management system and the recipient is a freight system.

11. The method of claim 8, where the first message flow detail identifies an inbound message handler of the recipient.

12. The method of claim 8, where the outbound message includes order information.

13. The method of claim 8, where the outbound transformation ruleset specifies one or more of: message field addition, message field deletion, message field modification, message field reordering, data modification, data creation, data derivation, data re-ordering, data format conversion, or data field default values.

14. The method of claim 8, where the asynchronous transformation process further causes automated logic in the recipient to be executed.

15. A non-transitory machine readable medium encoded with instructions that when executed by one or more processors cause the processors to perform operations comprising:

executing an outbound asynchronous transformation process and executing a distinct synchronous wrapper process for the outbound asynchronous transformation process;

where executing the synchronous wrapper process comprises:

maintaining configuration information specifying one or more message flow details for a recipient;

receiving a notification that a first message flow detail has been changed, and updating the configuration information in response to the notification;

receiving an outbound message from a sender;

passing the outbound message to the outbound asynchronous transformation process;

waiting for an acknowledgement from the outbound asynchronous transformation process, the acknowledgment indicating that the outbound message was received by the outbound asynchronous transformation process; and where executing the outbound asynchronous transformation process comprises:

receiving the outbound message from the synchronous wrapper process;

sending the acknowledgment to the synchronous wrapper process;

applying an outbound transformation ruleset to transform the outbound message into an outbound transformed message; and asynchronously communicating the outbound transformed message to the recipient according to the message flow details in the updated configuration information.

16. The machine readable medium of claim 15, where the wrapper process receives the outbound message from an order management system, the recipient is a freight system, and the outbound message includes order information.

17. The machine readable medium of claim 15, where the first message flow detail identifies an inbound message handler of the recipient.

18. The machine readable medium of claim 15, where the asynchronous transformation process further causes automated logic in the recipient to be executed.

19. The machine readable medium of claim 15, where the recipient includes a recipient inbound message handler and a recipient outbound message handler, and the operations further comprise:

executing a sender inbound message handler, and executing an inbound asynchronous transformation process configured to:

obtain an inbound message from the recipient outbound message handler responsive to the outbound transformed message;

transform the inbound message into an inbound transformed message by applying an inbound transformation ruleset to the inbound message; and communicate the inbound transformed message to the sender inbound message handler.

\* \* \* \* \*